United States Patent [19]
Schwarz

[11] Patent Number: 5,393,978
[45] Date of Patent: Feb. 28, 1995

[54] INFRARED DETECTORS HAVING FRONT AND REAR FIELDS OF VIEW

[76] Inventor: Frank Schwarz, 156 Thunderhill Dr., Stamford, Conn. 06902

[21] Appl. No.: 129,741

[22] Filed: Sep. 30, 1993

Related U.S. Application Data

[63] Continuation-in-part of Ser. No. 12,432, Feb. 4, 1993.

[51] Int. Cl.$^6$ .................. G08B 13/191; G08B 13/193; G01J 5/08
[52] U.S. Cl. .................................. 250/353; 250/342; 250/DIG. 1
[58] Field of Search ............... 250/338.3, 342, 353, 250/DIG. 1; 340/567, 600

[56] References Cited

U.S. PATENT DOCUMENTS

| | | | |
|---|---|---|---|
| 3,886,360 | 5/1975 | Reiss et al. | 250/338 |
| 3,958,118 | 5/1976 | Schwarz | 250/221 |
| 4,052,716 | 10/1977 | Mortensen | 340/233 |
| 4,319,229 | 3/1982 | Kirkor | 340/521 |
| 4,321,591 | 3/1982 | Vieweg | 340/521 |
| 4,438,428 | 3/1984 | Ober et al. | 340/521 |
| 4,446,454 | 5/1984 | Pyle | 340/538 |
| 4,484,181 | 11/1984 | Schwartz | 340/521 |
| 4,533,094 | 8/1985 | Steinman, Jr. | 340/521 |
| 4,644,147 | 2/1987 | Züblin | 250/342 X |
| 4,660,024 | 4/1987 | McMaster | 340/522 |
| 4,703,171 | 10/1987 | Kahl et al. | 250/221 |
| 4,746,906 | 5/1988 | Lederer | 340/522 |
| 4,752,769 | 6/1988 | Knaup et al. | 250/342 X |
| 5,066,855 | 11/1991 | Lee | 250/342 X |
| 5,077,548 | 12/1991 | Dipoala | 340/522 |
| 5,083,025 | 1/1992 | Blomberg | 250/342 X |
| 5,117,223 | 5/1992 | Tanner | 340/693 |

FOREIGN PATENT DOCUMENTS

| | | | |
|---|---|---|---|
| 3812969 | 11/1989 | Germany | 340/567 |
| 1-217221 | 8/1989 | Japan | 250/342 |

*Primary Examiner*—Constantine Hannaher
*Assistant Examiner*—Edward J. Glick
*Attorney, Agent, or Firm*—David P. Gordon

[57] ABSTRACT

A motion sensor having front and rear fields of view includes a housing containing an infrared sensor mounted on a surface which may be a circuit board containing associated electronics to form the motion detector which produces an output in response to the motion of a warm body passing through the sensor's field of view. A front part of the housing is provided with a forward looking optical system, preferably a multifaceted Fresnel lens, and a rear part of the housing is provided with at least one rearward looking optical system. A reflector is provided directly between the sensor and the forward looking optical system for reflecting infrared light entering the rearward looking optical system onto the detector. According to one embodiment of the invention, the rearward looking optical system includes a pair of Fresnel lenses and the reflector is a flat mirror. In another embodiment of the invention, the rearward looking optical system includes a pin hole and the reflector is a reflective surface on the inside of the forward looking optical system. In yet another embodiment of the invention, the rearward looking optical system is a window without any lens and the reflector is a focusing mirror. According to a preferred embodiment of the invention, the rearward field of view is directed downward.

27 Claims, 9 Drawing Sheets

INFRARED DETECTORS HAVING FRONT AND REAR FIELDS OF VIEW

This application is a continuation-in-part of U.S. application Ser. No. 08/012,432, filed Feb. 4, 1993, which is hereby incorporated by reference herein in its entirety.

BACKGROUND OF THE INVENTION

1. Field of the Invention

The present invention relates broadly to infrared sensors. More particularly, the present invention relates to passive infrared sensors for typical use in motion detectors which automatically turn on lights in the presence of a warm body.

2. State of the Art

Infrared sensors for use in motion detectors are well known in the art of security systems and are often associated with security lighting. U.S. Pat. No. 3,958,118 to Schwarz and U.S. Pat. No. 5,066,855 to Lee describe passive infrared motion detectors which turn lights on in response to the approach of a warm body such as a person or a vehicle. In order to increase the sensitivity of these systems, it is known to provide an optical system in front of the infrared sensor. Such optical systems generally broaden the field of view of the sensor so that a warm body approaching the detector is detected from several angles. The typical range of a motion detector with an optical system is about fifty to seventy feet with an angle of view of about seventy-five to one hundred eighty degrees.

The detectors of the prior art are typically placed at the periphery of an area to be secured, e.g. a home, an office building, etc., with the sensor's field of view directed outward from the area to be secured. The lights turned ON by the detector are most often coupled to a timer which keeps the lights ON for a predetermined amount of time after the last motion was detected by the sensor. This type of lighting system is usually referred to as automatic, responding (turning lights ON) only when a warm body approaches the secured area from the monitored front of the detector system. Upon exiting the secured area, however, the problem is that the lights are not turned ON until the warm body passes the periphery of the secured area into the forward facing field of view of the sensor. Thus, the warm body (person) is exposed to the hazards of darkness for a length of time before being detected by the detector.

It is also known in the art, as described in the aforementioned patent to Lee, as well as in U.S. Pat. No. 4,644,147 to Zublin to use reflective surfaces to broaden the field of vision of a sensor. These disclosures, however, neither recognize the advantages of, nor provide a means for sensing the warm body from behind the detector so that illumination can be provided upon exiting an area.

SUMMARY OF THE INVENTION

It is therefore an object of the invention to provide an infrared detector having both forward and rear fields of view.

It is another object of the invention to provide an infrared detector having a broad forward field of view and downward directed rear field of view.

It is also an object of the invention to provide an infrared detector with a rear field of view which does not detract significantly from the sensitivity of its forward field of view.

It is a further object of the invention to provide an infrared detector with a rear field of view having a substantially shorter range than the range of its forward field of view.

Another object of the invention is to provide means for selecting the relative sensitivity of the rear field of view compared to the forward field of view of the detector.

In accord with these objects which will be discussed in detail below, an infrared detector having front and rear fields of view is provided and includes a housing containing a passive infrared sensor mounted on a circuit board containing associated electronics to form the detector which produces an output in response to the motion of a warm body passing through the sensor's field of view. A front part of the housing is provided with a forward looking optical system, and a rear part of the housing is provided with a rearward looking optical system. Reflective means are provided either directly between the detector and the forward looking optical system or on the forward looking optical system itself for reflecting infrared rays entering the rearward looking optical system onto the sensor.

According to one embodiment of the invention, the rearward looking optical system includes a pair of multi-faceted Fresnel lenses and the reflective means includes a flat mirror. In another embodiment of the invention, the rearward looking optical system includes a pin hole and the reflective means is a reflective surface on the inside of the forward looking optical system. In yet another embodiment of the invention, the rearward looking optical system is an opening without any lens means and the reflective means is a focusing mirror. According to preferred aspects of the invention, the vertical field of view of the rearward looking light aperture is lower and narrower than the vertical field of view of the forward looking optical system. In addition, the rearward looking field of view is not as sensitive as the forward looking field of view. In fact, depending upon the configuration of the rearward looking light aperture(s), the rearward looking field of view may have approximately 1–2% the sensitivity of the forward looking field of view. Accordingly, when the forward looking field of view has a range of approximately fifty to seventy feet and the rearward looking field of view has a range of approximately five to ten feet.

As used herein, the term "light" includes visible light and invisible infrared radiation. While the invention is designed to be used with an infrared detector, those skilled in the art will realize that other wavelengths of radiation could also be detected by the invention.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
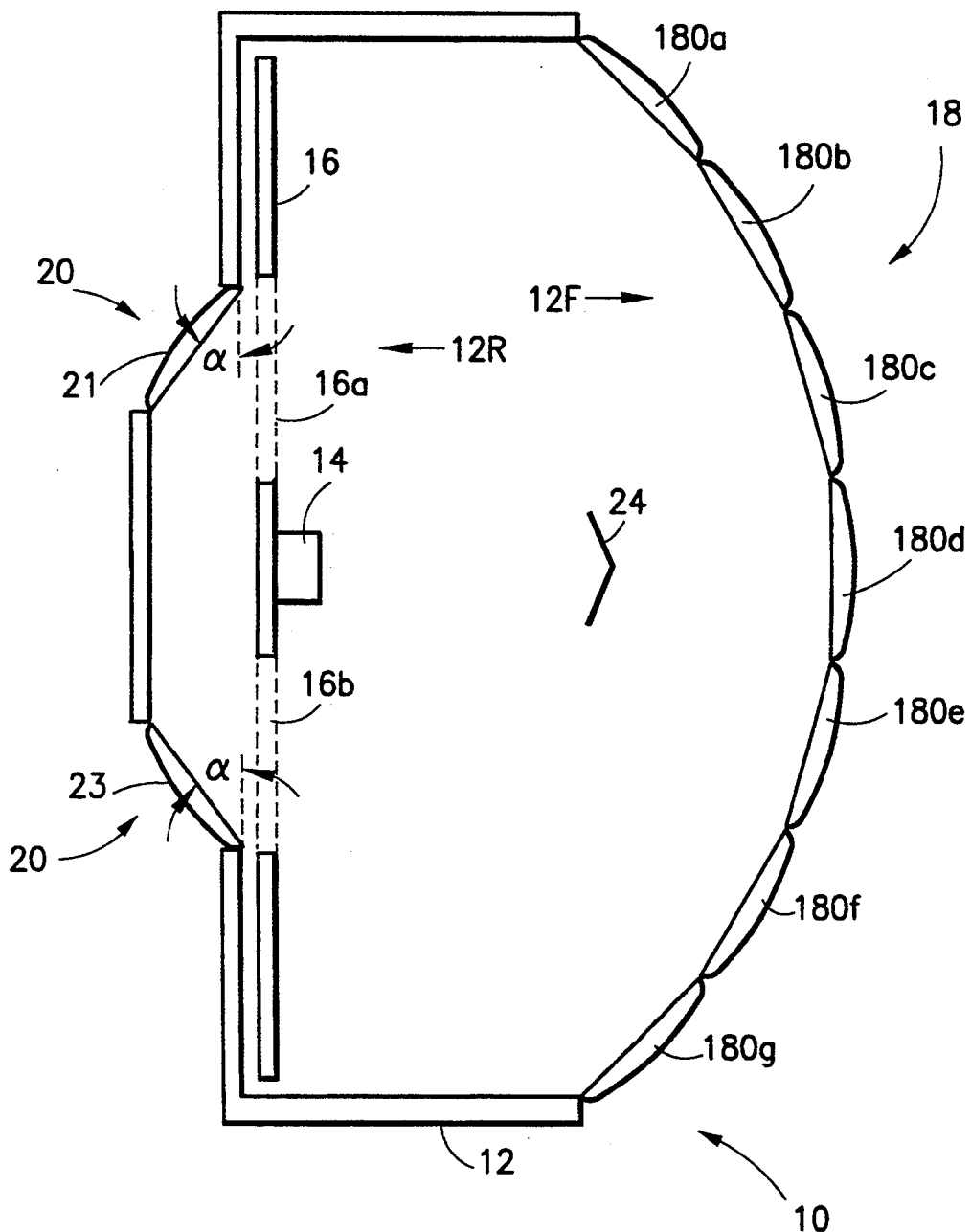
FIG. 1 is a schematic top view of a first embodiment of the infrared detector of the invention.
Figure 2:
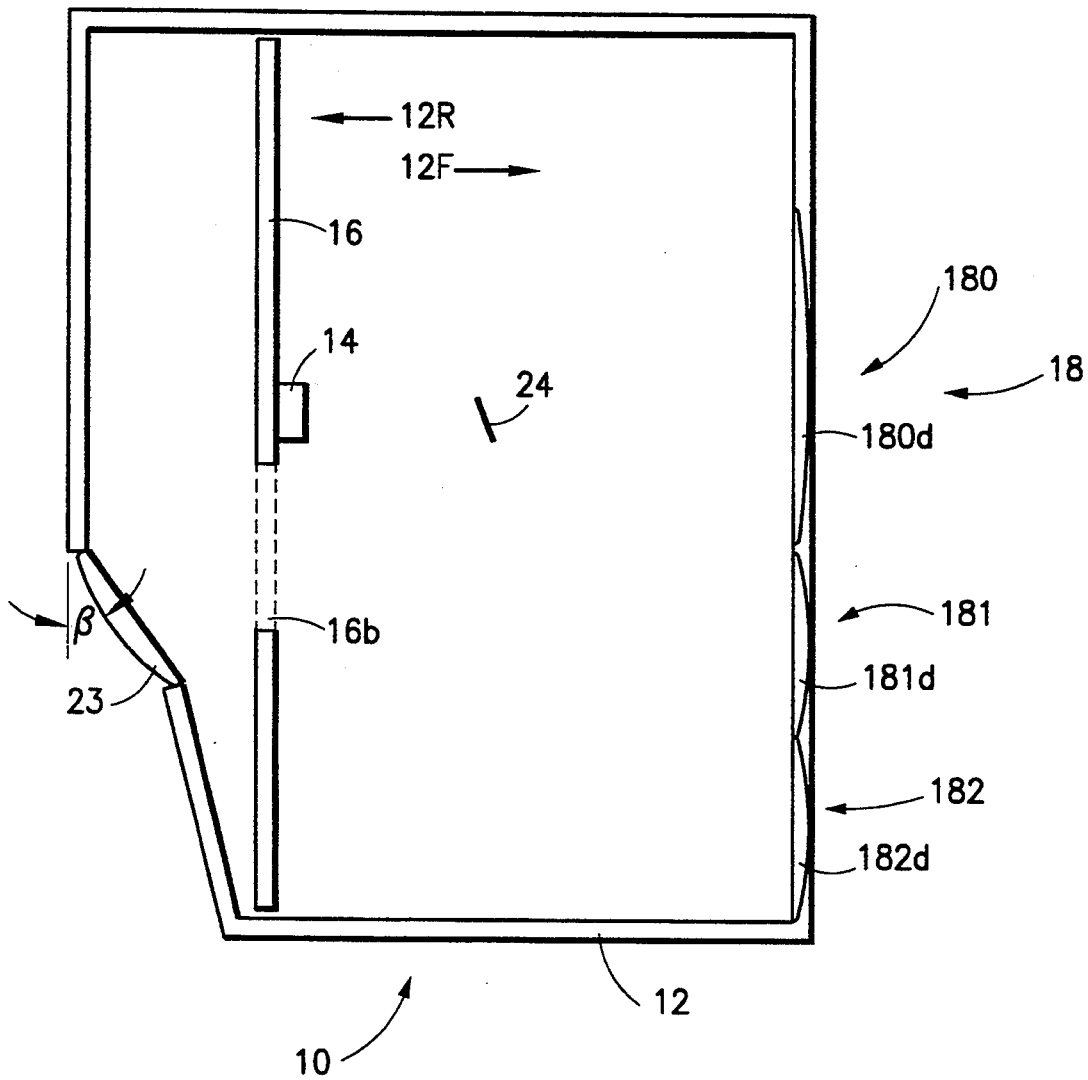
FIG. 2 is a schematic side view of the infrared detector of FIG. 1.

Referring now to FIGS. 1 and 2, a first embodiment of the motion detector 10 of the invention is provided and includes a housing 12 having front portion 12F and rear portion 12R, a passive infrared sensor 14 which is typically mounted on a circuit board 16 in the housing 12, a "forward looking" optical system 18 located at the front of the front portion 12F of the housing, a "rearward looking" optical system 20 located at the rear of the rear portion 12R of the housing, and a mirror 24 located between optical systems 18 and 20. As indicated in FIGS. 1 and 2, the sensor 14 is mounted to the circuit board 16 in a conventional way and the circuit (not shown) on the circuit board 16 is a conventional circuit for providing an output signal when the sensor senses the motion of a warm body. The circuit board 16 is preferably mounted in the rear portion 12R of the housing 12 perpendicular to the longitudinal axis of the housing 12 with the sensor 14 facing the front portion 12F of the housing 12.

The forward looking optical system 18 mounted in the front portion 12F of the housing 12 preferably comprises a polyethylene Fresnel lens 18 having multiple facets or segments 189a, 180b, ... 180g, 181a, 181b, ... 181b, 182a, 182b, ... 182g. As seen in FIG. 1, each of the three groups 180, 181, 182 of the multiple facets or segments are arranged in a convex arc.

According to a first embodiment of the invention, the rear portion 12R of housing 12 is provided with a rearward looking light optical system 20 having individual Fresnel lenses 21, 23. The mirror 24 is mounted directly between the sensor 14 and the front portion 12F of the housing 12. Holes 16a, 16b in the circuit board 16 are provided to allow infrared rays entering Fresnel lenses 21, 23 to pass freely onto the surface of mirror 24. These rays are then reflected back onto the sensor 14 for detection. In most applications it is neither necessary nor desirable that the rear field of view of the detector 10 be as sensitive as the front field of view. A warm body exiting a protected area will generally be quite close to (albeit in back of) the sensor at the time lights should be turned on to provide an illuminated exit. Therefore, the mirror 24 is preferably chosen to be relatively small so that it does not interfere significantly with the forward field of view of the sensor. In addition, as shown in the Figures, the rearward looking Fresnel lenses 21, 23 are preferably angled by an angle α relative to the horizontal to provide a wide horizontal field of view. Further, since the motion detector 10 is likely to be mounted from a ceiling, eve, or other high location, it is usually advantageous that the rear field of view be directed at an angle β away from the vertical as suggested by the angle of Fresnel lens 23 seen in FIG. 2. As also shown in FIG. 2, the forward looking optical system 18 advantageously consists of a plurality of groups of Fresnel lenses 180, 181, 182 having multiple facets or segments arranged along a convex arc (as seen in FIG. 1) to provide the forward field of view with multiple vertical levels. Generally, the lower lenses are smaller than the upper lenses. The upper lenses are designed for longer range sensing while the lower lenses are closer range sensing. Thus, the lower lenses do not need to provide as much optical gain and can be made smaller.

Figure 1A:
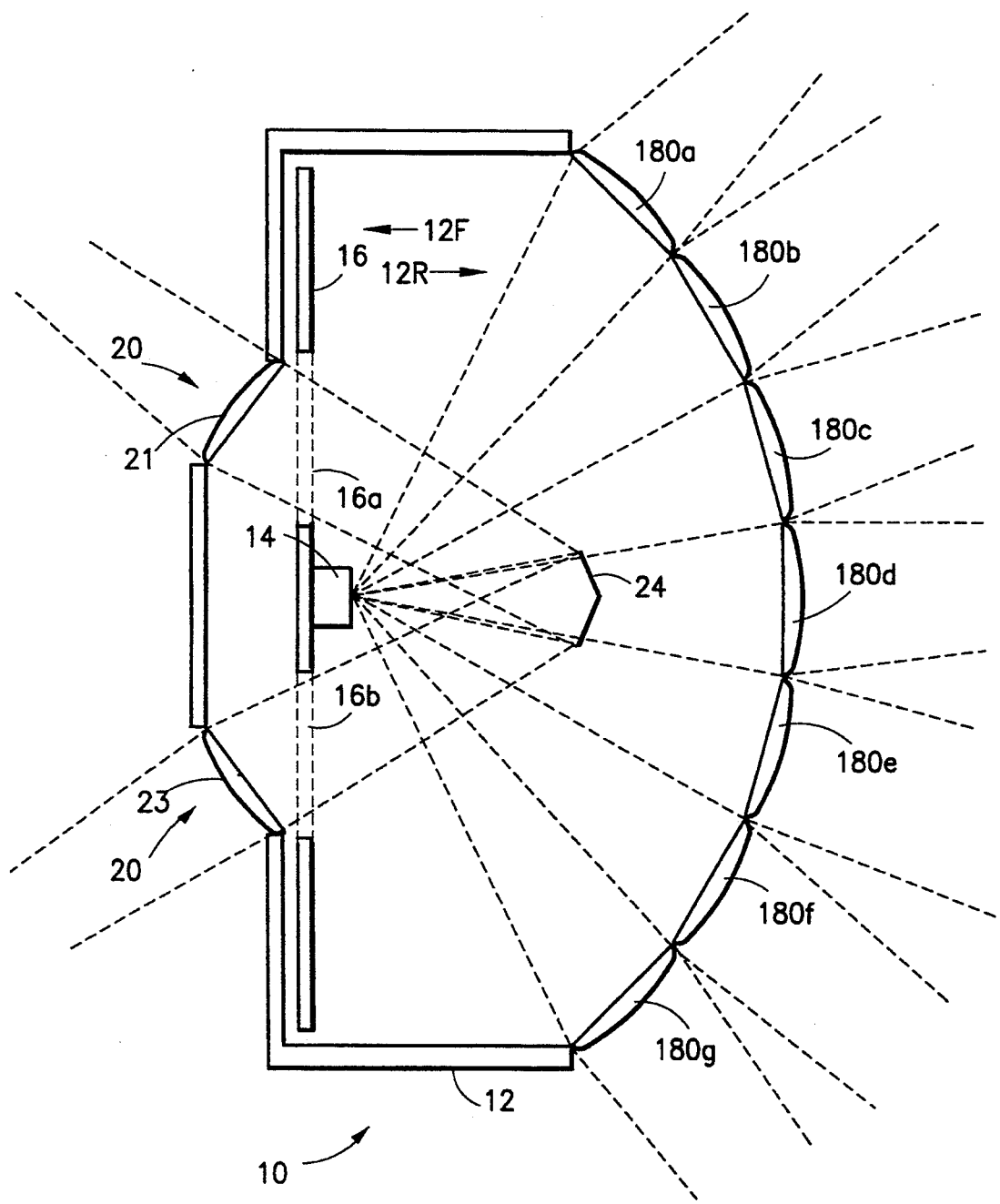
FIG. 1a is a view similar to FIG. 1 showing the paths of light from the front field of view and the rear field of view onto the sensor.
Figure 2A:
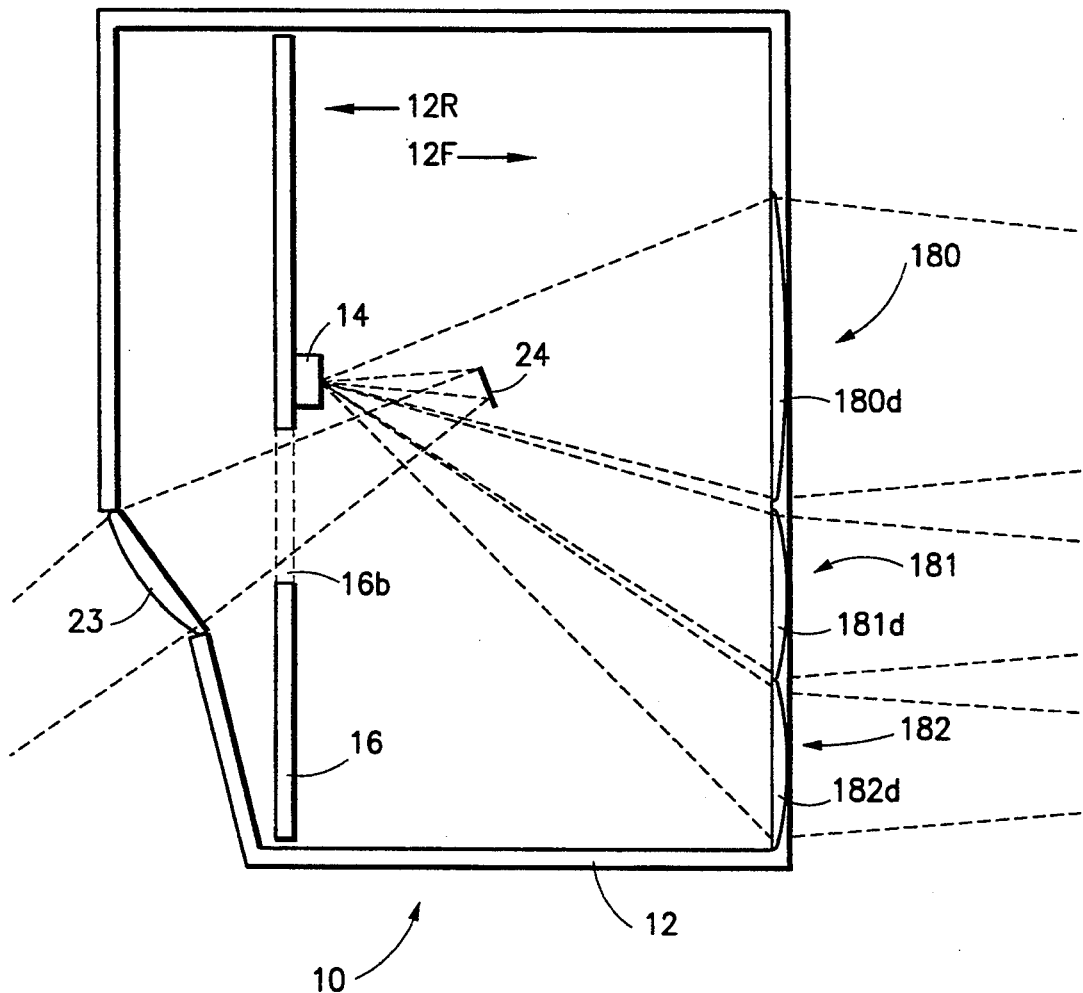
FIG. 2a is a view similar to FIG. 2 showing the paths of light from the front field of view and the rear field of view onto the sensor.

FIGS. 1a and 2a illustrate the paths taken by light (including infrared rays) entering the sensor from both the front and the rear. The dotted lines indicate convergence or focal lengths rather than the field of view. Light entering from the front of the sensor is directed by the Fresnel segments of the forward looking optical system 18 directly onto the sensor 14. Light entering from the rear of the sensor is directed (focused) by the Fresnel lenses 21, 23 of the rearward looking optical system 20 toward the mirror 24 which in turn reflects the light onto the sensor 14. It will be seen in FIGS. 1a and 2a that mirror 24 only partially blocks a center segment (180d) of the forward looking optical system 18 while reflecting light from lenses 21, 23 onto the sensor 14. While lenses 18, 21, 23 are shown as having the same focal length, i.e. approximately 30 mm, optical design considerations may warrant different focal lengths. The angles at which the rearward looking optical system monitors the field may be varied as desired and may even allow for coverage greater than 180 degrees.

Figure 1B:
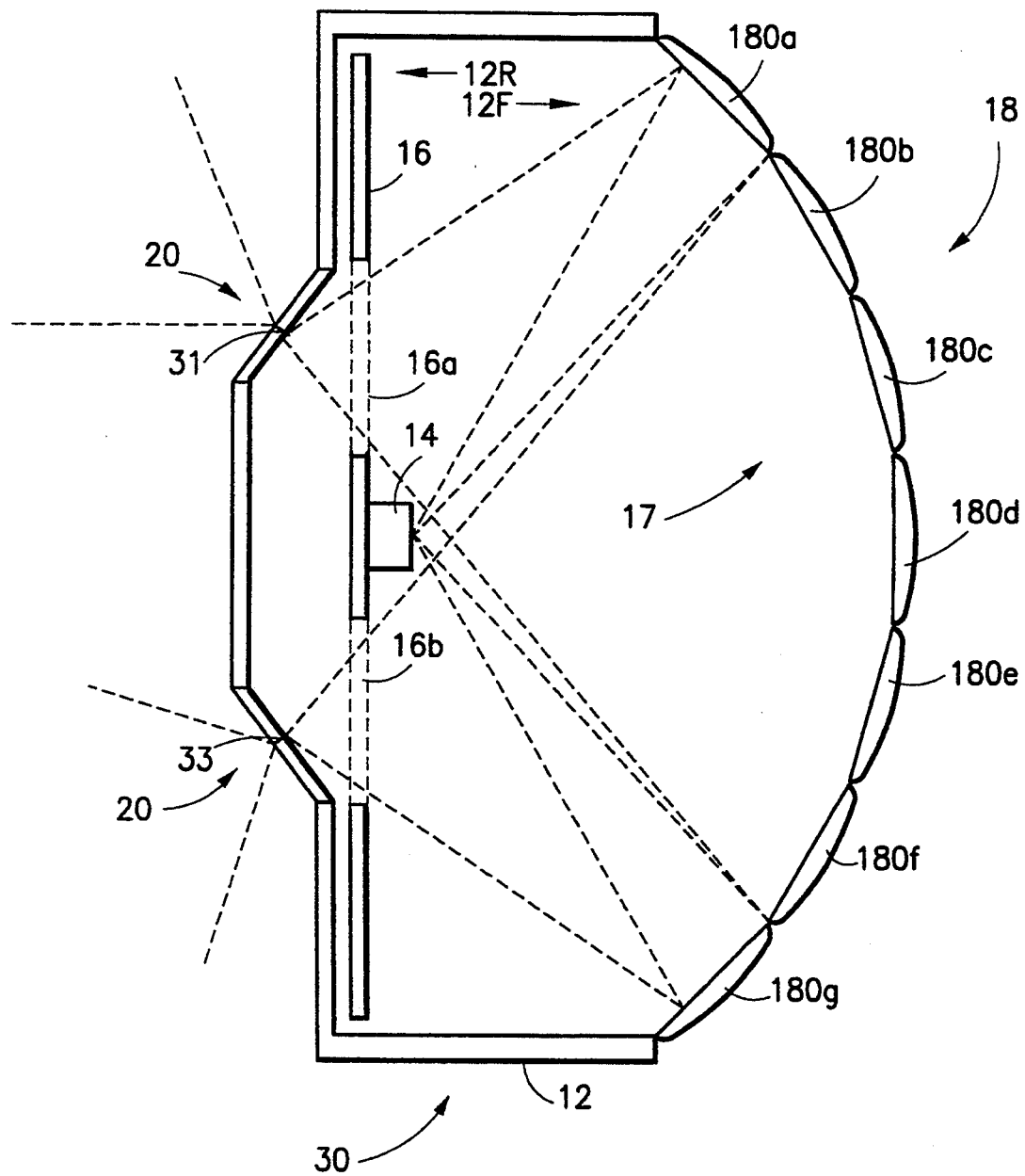
FIG. 1b is a view similar to FIG. 1a, but of a second embodiment of the invention showing the paths of light from the rear field of view onto the sensor.
Figure 2B:
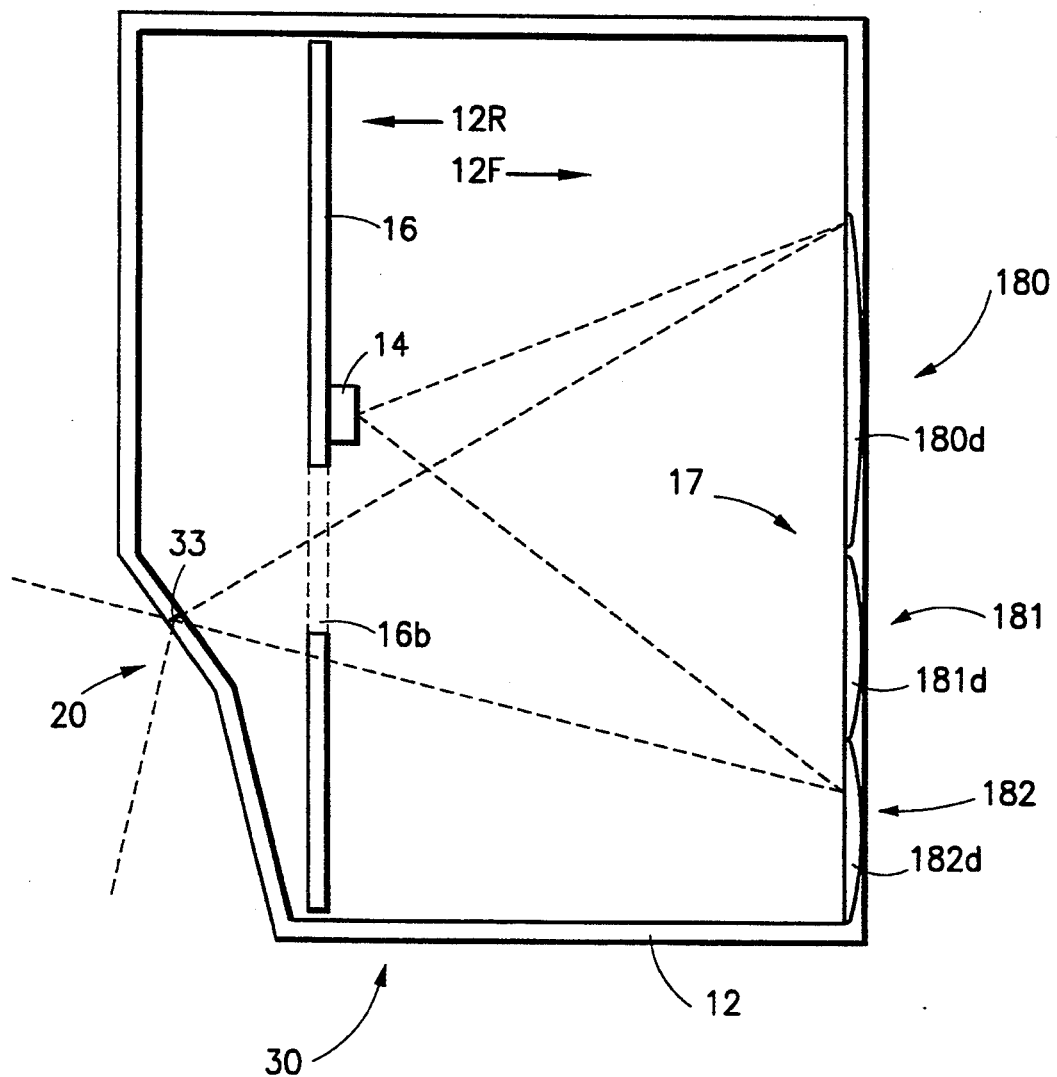
FIG. 2b is a schematic side view of the infrared detector of FIG. 1b.

A second embodiment of the invention is shown in FIGS. 1b and 2b. The second embodiment of the detector 30 is substantially the same as the first embodiment described above except that in this embodiment the rearward looking optical system 22 comprises pin holes 31, 33. In addition, in lieu of mirror 24, at least a portion of the interior surface 17 of the forward looking optical system 18 is made reflective either by polishing or by selectively coating portions of the interior surface 17 with aluminum or silver. The amount of polishing and/or coating together with the shape and angle of the interior surface 17 will affect the rearward looking sensitivity of the detector 30 and therefore provides a means for selecting the rearward looking sensitivity. As seen in FIGS. 1b and 2b, light entering through pin holes 31, 33 is focused onto the reflective portion of the inner surface 17 of lens 18 which reflects the light onto the sensor 14. Although not shown in FIGS. 1b and 2b, it will be appreciated that light entering the forward looking lens 18 follows the same path as described above with reference to FIGS. 1a and 2a.

Figure 1C:
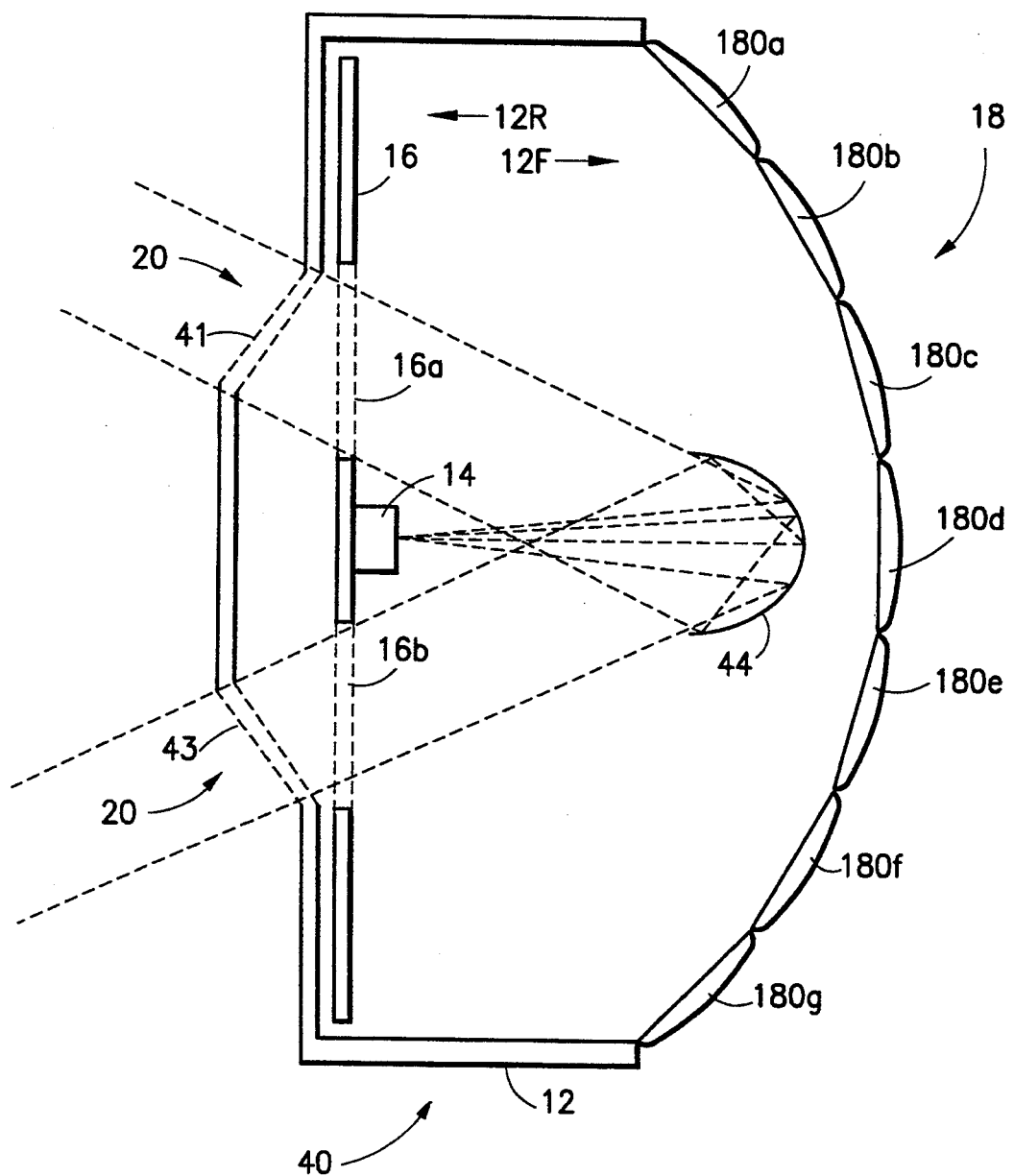
FIG. 1c is a view similar to FIG. 1b, but of a third embodiment of the invention.
Figure 2C:
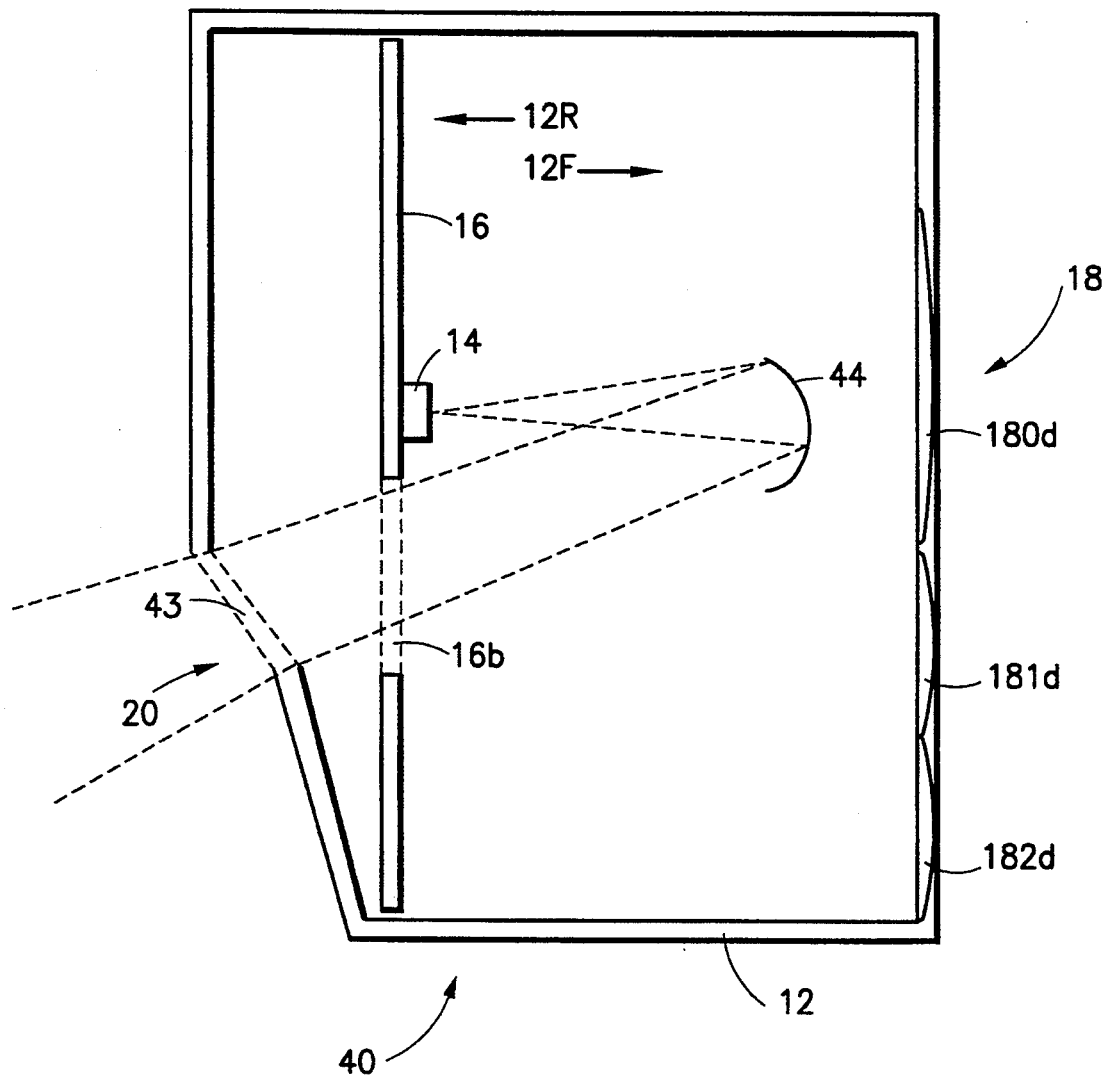
FIG. 2c is a schematic side view of the infrared detector of FIG. 1c.

A third embodiment 40 of the invention is shown in FIGS. 1c and 2c. As with the first two embodiments, the forward looking optical system 18 remains substantially unchanged. However, in this embodiment, the rearward looking optical system 20 is comprised of windows 41, 43. The windows 41, 43 are preferably openings covered with infrared transparent material which seals the detector 40 from dust, moisture, and other environmental agents. A focusing mirror 44 is mounted between the sensor 14 and the forward looking optical system 18 to reflect and focus the infrared rays entering through the windows 41, 43 onto the sensor 14. As shown in FIGS. 1c and 2c, the mirror 44 is a parabolic dish reflector. Those skilled in the art will recognize, however, that other configurations of a mirror can be utilized to provide the necessary focusing of light entering through windows 41, 43. All that is required is that the mirror direct the infrared rays entering through the windows 41, 43 and onto the sensor 14. Although not shown in FIGS. 1c and 2c, it will be appreciated that infrared light entering the forward looking lens 18 follows the same path as described above with reference to FIGS. 1a and 2a.

Figure 3:
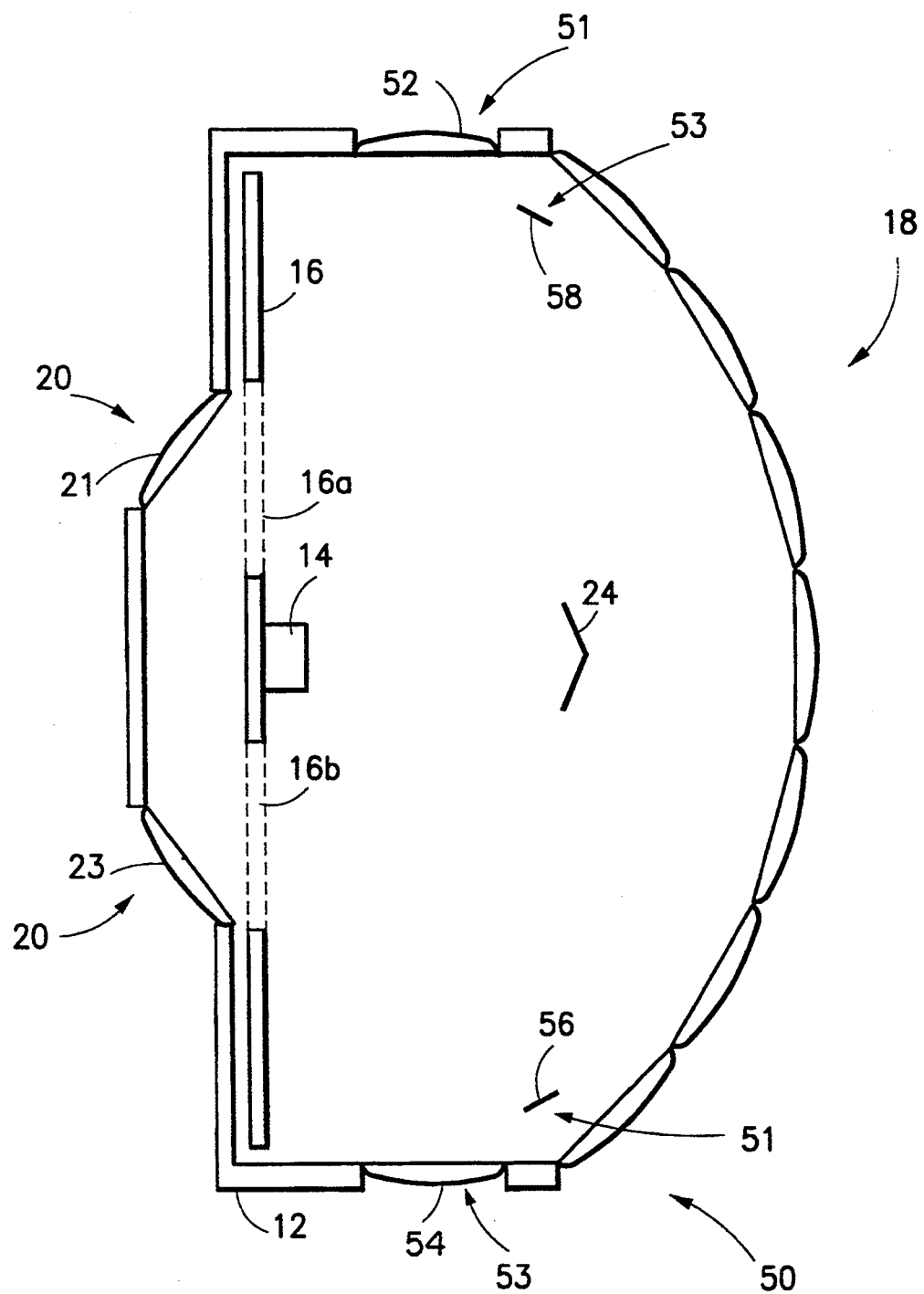
FIG. 3 is a view similar to FIG. 1, but of a fourth embodiment of the invention.

With the benefit of the disclosure thus far, those skilled in the art will appreciate that other window/aperture and reflector combinations could well be added to the invention to provide yet additional fields of view. As shown in FIG. 3, for example, a fourth embodiment 50 of the invention is shown with a pair of sideward looking optical systems 51, 53 having respective lenses 52, 54 and reflectors 56, 58. It will therefore be appreciated that the sideward looking optical systems 51, 53 together with the forward and rearward looking optical systems 18, 20, can be designed to provide a substantially three hundred-sixty degree field of view to the sensor 14. The actual field of view and the relative sensitivity of the detector in any selected direction may be varied according to the principles described above.

There have been described and illustrated herein several embodiments of a motion detector having front and rear fields of view. While particular embodiments of the invention have been described, it is not intended that the invention be limited thereto, as it is intended that the invention be as broad in scope as the art will allow and that the specification be read likewise. Thus, while particular rearward looking optical systems have been disclosed in conjunction with particular configurations of mirrors or reflectors, it will be appreciated that other systems could be utilized. Also, while particular forward looking optical systems utilizing Fresnel lenses have been shown, it will be recognized that other types of optics could be used with similar results obtained. Further, while the motion detector has been disclosed as having one segmented forward looking lens and two angled rearward looking lenses, windows, or apertures, it will be understood that different numbers of lenses, mirrors, windows, or apertures can achieve the same or similar function as disclosed herein. In addition, while the sensor has been shown as mounted on a circuit board, it will be understood that other mounting means could be used to achieve substantially the same purpose. It will therefore be appreciated by those skilled in the art that yet other modifications could be made to the provided invention without deviating from its spirit and scope as so claimed.

I claim:

1. An infrared detector, comprising:
   a) a housing having a front portion and a rear portion;
   b) an infrared sensor mounted within said housing and facing said front portion of said housing;
   c) a forward looking optical means mounted in said front portion of said housing for directing infrared energy onto said infrared sensor from a source of infrared energy located forward said housing, said forward looking optical means facing in a first direction;
   d) a rearward looking optical means mounted in said rear portion of said housing for permitting infrared energy to enter said housing from a source of infrared energy located rearward said housing, said rearward looking optical means facing in a second direction which is substantially more than ninety degrees from said first direction; and
   e) reflective means mounted inside said housing directly between said infrared sensor and said forward looking optical means for reflecting infrared energy entering said housing through said rearward looking optical means onto said infrared sensor.

2. An infrared detector according to claim 1, wherein:
   said infrared sensor is mounted on a mounting base in said rear portion of said housing, said mounting base being located substantially in a plane perpendicular to a longitudinal axis of said housing, the longitudinal axis extending from said front portion to said rear portion, and
   said rearward looking optical means is mounted at an angle relative to said plane.

3. An infrared detector according to claim 2, wherein:
   said mounting base is provided with at least one cut-out which permits infrared rays entering said rearward looking optical means to pass through said mounting base to said reflective means.

4. An infrared detector according to claim 3, wherein:
   said mounting base comprises a circuit board.

5. An infrared detector according to claim 2, wherein:
   said mounting base comprises a circuit board.

6. An infrared detector according to claim 1, wherein:
   said rearward looking optical means comprises at least one Fresnel lens angled relative to a longitudinal axis of said housing defined by an orientation of said infrared sensor toward said front portion of said housing.

7. An infrared detector according to claim 6, wherein:
   one of said angled Fresnel lens and said reflective means is oriented at a downward angle from said housing and provides a rearward field of view which is angled downward from said sensor.

8. An infrared detector according to claim 1, wherein:
   said rearward looking optical means comprises a pair of Fresnel lenses each angled oppositely relative to a longitudinal axis of said housing defined by an orientation of said infrared sensor toward said front portion of said housing.

9. An infrared detector according to claim 5, wherein:
   said reflective means comprises at least one mirror.

10. An infrared detector according to claim 9, wherein:
    said mirror includes at least one flat portion.

11. An infrared detector according to claim 9, wherein:
    said mirror is curved.

12. An infrared detector according to claim 9, wherein:
    said mirror is a focusing mirror.

13. An infrared detector according to claim 1, wherein:
    said rear portion of said housing includes at least one wall angled relative to a longitudinal axis of said housing defined by an orientation of said infrared sensor toward said front portion of said housing, and
    said rearward looking optical means comprises at least one pin hole in said angled wall.

14. An infrared detector according to claim 8, wherein:
said at least one wall comprises a pair of walls oppositely angled relative to said longitudinal axis, and
said rearward looking optical means comprises at least one pin hole in each of said angled walls of said rear portion of said housing.

15. An infrared detector according to claim 14, wherein:
said reflective means comprises a polished portion of an inner surface of said forward looking optical means.

16. An infrared detector according to claim 14, wherein:
said reflective means comprises a plated portion of an inner surface of said forward looking optical means.

17. An infrared detector according to claim 13, wherein:
said infrared sensor is mounted on a mounting base in said rear portion of said housing, and
said mounting base is provided with at least one cutout which permits infrared rays entering said rearward looking optical means to pass through said mounting base to said reflective means.

18. An infrared detector according to claim 17, wherein:
said mounting base comprises a circuit board.

19. An infrared detector according to claim 13, wherein:
one of said angled wall and said reflective means is oriented at a downward angle from said housing and provides a rearward field of view which is angled downward from said sensor.

20. An infrared detector according to claim 1, wherein:
said rear portion of said housing includes at least one wall angled relative to a longitudinal axis of said housing defined by an orientation of said infrared sensor toward said front portion of said housing, and
said rearward looking optical means comprises a window covered with an infrared transparent material.

21. An infrared detector according to claim 20, wherein:
one of said angled wall and said reflective means is oriented at a downward angle from said housing and provides a rearward field of view which is angled downward from said sensor.

22. An infrared detector according to claim 1, wherein:
said at least one wall comprises a pair of oppositely angled walls, and
said rearward looking optical means comprises at least one window covered with infrared transparent material in each of said pair of angled walls of said rear portion of said housing.

23. An infrared detector according to claim 1, wherein:
said forward looking optical means comprises a Fresnel lens.

24. An infrared detector according to claim 23, wherein:
said Fresnel lens is a segmented Fresnel lens arranged along a convex arc.

25. An infrared detector according to claim 1, further comprising:
f) a first sideward looking optical means mounted in a first side portion of said housing for permitting infrared energy to enter said housing from an infrared source located in a first sideward direction from said housing; and
g) second reflective means mounted inside said housing for reflecting infrared energy entering said housing through said first sideward looking optical means onto said infrared sensor.

26. An infrared detector according to claim 25, further comprising:
h) a second sideward looking optical means mounted in a second side portion of said housing for permitting infrared energy to enter said housing from an infrared source located in a second sideward direction from said housing; and
i) third reflective means mounted inside said housing for reflecting infrared energy entering said housing through said second sideward looking optical means onto said infrared sensor.

27. An infrared detector according to claim 26, wherein:
said forward looking optical means, said rearward looking optical means, said first sideward optical means and said second sideward optical means together provide said infrared sensor with a substantially 360 degree field of view.

* * * * *